United States Patent [19]

Hartmann et al.

[11] 4,007,215
[45] Feb. 8, 1977

[54] 1-(BIS-ETHOXYCARBONYL)-ACETYLAMINO-3-METHYL-3-(BIS-ETHOXYCARBONYL)-ACETYLAMINOMETHYL-5-DIMETHYL-CYCLOHEXANE

[75] Inventors: Heinrich Hartmann, Limburgerhof; Wolfgang Druschke, Dirmstein, both of Germany

[73] Assignee: BASF Aktiengesellschaft, Ludwigshafen (Rhine), Germany

[22] Filed: July 7, 1975

[21] Appl. No.: 593,762

[30] Foreign Application Priority Data

July 31, 1974 Germany .............. 2436872

[52] U.S. Cl. .............. 260/468 J; 260/75 TN
[51] Int. Cl.² .............. C07C 103/48
[58] Field of Search .............. 260/468 J

[56] References Cited

OTHER PUBLICATIONS

Dieckmann, Chem. Ber. 38, 4627, (1905).

Primary Examiner—Robert Gerstl
Attorney, Agent, or Firm—Johnston, Keil, Thompson & Shurtleff

[57] ABSTRACT 1-(Bis-ethoxycarbonyl)-acetylamino-3-methyl-3-(bis-ethoxycarbonyl)-acetylaminomethyl-5-dimethyl-cyclohexane, a new blocked diisocyanate, its manufacture from isophorone diisocyanate and diethyl malonate, and its use.

1 Claim, No Drawings

1-(BIS-ETHOXYCARBONYL)-ACETYLAMINO-3-METHYL-3-(BIS-ETHOXYCARBONYL)-ACETYLAMINOMETHYL-5-DIMETHYL-CYCLOHEXANE

The present invention relates to a new blocked diisocyanate and to its manufacture and use.

Blocked polyisocyanates, their manufacture and use, have already been disclosed.

However, the low molecular weight reaction products of aliphatic diisocyanates and CH-acidic compounds described, eg., by S. Petersen in Liebigs Annalen der Chemie, 562 (1949), 205 et seq., are solids with melting points above 80° C.

The blocked isocyanates described in U.S. Pat. No. 2,826,526 are also solid crystalline substances of melting point above 80° C, which are based on reaction products of CH-acidic compounds and diisocyanates or polyisocyanates and are employed as adhesives for rubber and other materials. The crosslinking temperatures of such systems are from 100° to 200° C and curing times in excess of 10 minutes are required.

It is an object of the present invention to provide a liquid blocked diisocyanate which exhibits particulary advantageous processing characteristics when used for the manufacture of polyurethanes and especially of adhesives and surface coatings.

The invention relates to a compound of the formula

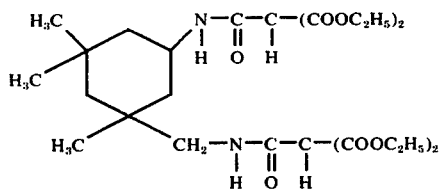

and to a process for its manufacture, wherein 1 mole of 3-isocyanatomethyl-3,5,5-trimethylcyclohexy isocyanate is reacted with 2 moles of diethyl malonate in the presence of catalytic amounts of alkali metal alcoholates or alkali metals.

This invention also relates to the use of the above compound for the manufacture of polyurethanes.

According to the invention, the blocked or masked diisocyanate of the formula

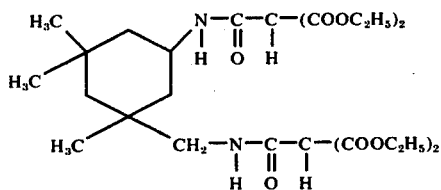

is manufactured by reaction of 1 mole of 3-isocyanatomethyl-3,5,5-trimethylcyclohexyl isocyanate (isophorone diisocyanate) and 2 moles of diethyl malonate in the presence of catalytic amounts, namely from 0.01 to 0.5 per cent by weight, and preferably from 0.02 to 0.2 per cent by weight, based on the total amount of the starting materials, of alkali metal alcoholates or alkali metals; a slight excess of diethyl malonate, eg. an excess of from 0.02 to 0.3 mole, can be employed in the reaction.

Examples of suitable alkali metals are lithium, potassium and, preferably, sodium, which it is desirable to employ in a finely divided form.

Preferred alkali metal alcoholates are those of aliphatic alcohols of from 1 to 6, preferably from 1 to 3, carbon atoms in the alkyl radical. Lithium methylate, lithium propylate, sodium ethylate, sodium butylate, potassium ethylate and potassium isopropylate are specific examples. Sodium methylate is particulary preferred and may, if desired, be employed as an about 30 percent strength solution in methanol. The reaction can be carried out at ambient temperature or elevated temperatures, eg. at from about 40° to 100° C, especially from 50° to 80° C.

The blocked diisocyanate of the invention, thus obtained, is liquid at room temperature and very easily processable.

The liquid block diisocyanate of the invention has the particular advantage over previously disclosed crystalline blocked isocyanates that it is easier to handle when used in, eg., adhesives or surface coatings. Thus, it can be mixed more readily with other additives. Furthermore, it is more compatible with, eg., co-components, than are solid blocked polyisocyanates. Because the compound of the invention has a low viscosity it is possible to produce, eg., adhesives or coatings resins of low use viscosity, and, as an advantage, the use of diluents, organic solvents or water as a dispersion medium can be dispensed with partially and, in special cases, even entirely. A further particular advantage of the new compounds is that in combination with reactive co-components, eg. hydroxylic polymers, such as polyester-ols or polyether-ols or hydroxylic copolymers, it is stable for lengthy periods at 80° C but rapidly undergoes scission at about 110° C and reacts, producing crosslinking.

In the Example, percentages are by weight.

EXAMPLE

Preparation of the Adduct 2.0 moles of diethyl malonate and 1 mole of isophorone diisocyanate are placed in a 4-neck flask equipped with a stirrer, thermometer and reflux condenser. After adding 0.15% of sodium methylate solution (of about 30 per cent strength in methanol) in 0.06 mole of diethyl malonate, the temperature rises to about 40° C. The mixture is then heated to 80° C and after 2 hours and again after 4 hours 0.075% of sodium methylate solution in 0.02 mole of diethyl malonate is added. After a reaction time of 8 hours the NCO content is about 0.8%. On lengthy standing at room temperature, the NCO content of the adduct falls to < 0.3%.

Analysis: $C_{26}H_{42}N_2O_{10}$ (542): Calculated: C, 57.6; H, 7.7; O 29.5; N 5.2. Found: C, 57.3; H 7.8; O 29.7; N, 5.2.

We claim:

1. The compound of the formula

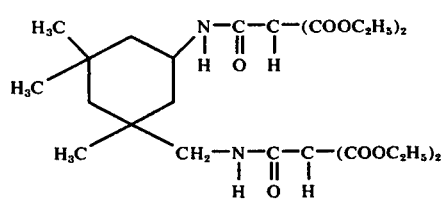

* * * * *